United States Patent [19]
Hobson et al.

[11] Patent Number: 5,745,676
[45] Date of Patent: Apr. 28, 1998

[54] AUTHORITY REDUCTION AND RESTORATION METHOD PROVIDING SYSTEM INTEGRITY FOR SUBSPACE GROUPS AND SINGLE ADDRESS SPACES DURING PROGRAM LINKAGE

[75] Inventors: Stephen James Hobson, Middx, United Kingdom; Kenneth Ernest Plambeck, Poughkeepsie, N.Y.

[73] Assignee: International Business Machines Corporation, Armonk, N.Y.

[21] Appl. No.: 566,557

[22] Filed: Dec. 4, 1995

[51] Int. Cl.$^6$ .............................. G06F 11/00; G06F 12/14
[52] U.S. Cl. ........................ 395/186; 395/490; 364/246; 364/246.6; 364/286.4
[58] Field of Search ..................... 395/186, 183.14, 395/187.01, 188.01, 376, 381, 427, 471, 479, 490, 491, 726, 727, 568, 580; 364/246, 246.3, 246.6, 247.2, 222.5, 286.4, 286.5, 260.81

[56] References Cited

U.S. PATENT DOCUMENTS

| | | | |
|---|---|---|---|
| 4,366,537 | 12/1982 | Heller et al. | 364/200 |
| 4,809,160 | 2/1989 | Mahon et al. | 364/200 |
| 4,979,098 | 12/1990 | Baum et al. | 364/256.3 |
| 5,023,773 | 6/1991 | Baum et al. | 364/286.4 |
| 5,220,669 | 6/1993 | Baum et al. | 395/775 |
| 5,361,356 | 11/1994 | Clark et al. | 395/700 |
| 5,465,341 | 11/1995 | Doi et al. | 395/183.06 |
| 5,493,661 | 2/1996 | Alpert et al. | 395/418 |

*Primary Examiner*—Robert W. Beausoliel, Jr.
*Assistant Examiner*—Dieu-Minh Le
*Attorney, Agent, or Firm*—Marc A. Ehrlich; Bernard M. Goldman

[57] ABSTRACT

Provides data and program integrity in a computer system by guarding against malicious program operation when using the Branch In Subspace Group instruction (BSG) of the S/390 computer architecture. System integrity is ensured by providing a controlled target space (a base space) and branch address during a BSG transfer of control (branch) from a subspace, and a different PSW key mask (PKM) for the base space than for subspaces. More specifically, (1) the PKM is reduced and a new PSW access key is set during a BSG branch from the base space to a subspace, (2) the original PKM and access key and also a return address are saved in a secure data area during the same branch, and (3), during a branch from a subspace, the original PKM and access key are restored, and the branch is made to the return address (the controlled branch address) in the base space. The method is extended to apply to a single address space by a novel Branch and Set Authority instruction (BSA) that, when executed in a base-authority state, saves a return address and base authority in a secure data area and sets a reduced-authority state; and, when executed in the reduced-authority state, branches to the saved return address, restores the saved base authority, and sets the base-authority state.

15 Claims, 6 Drawing Sheets

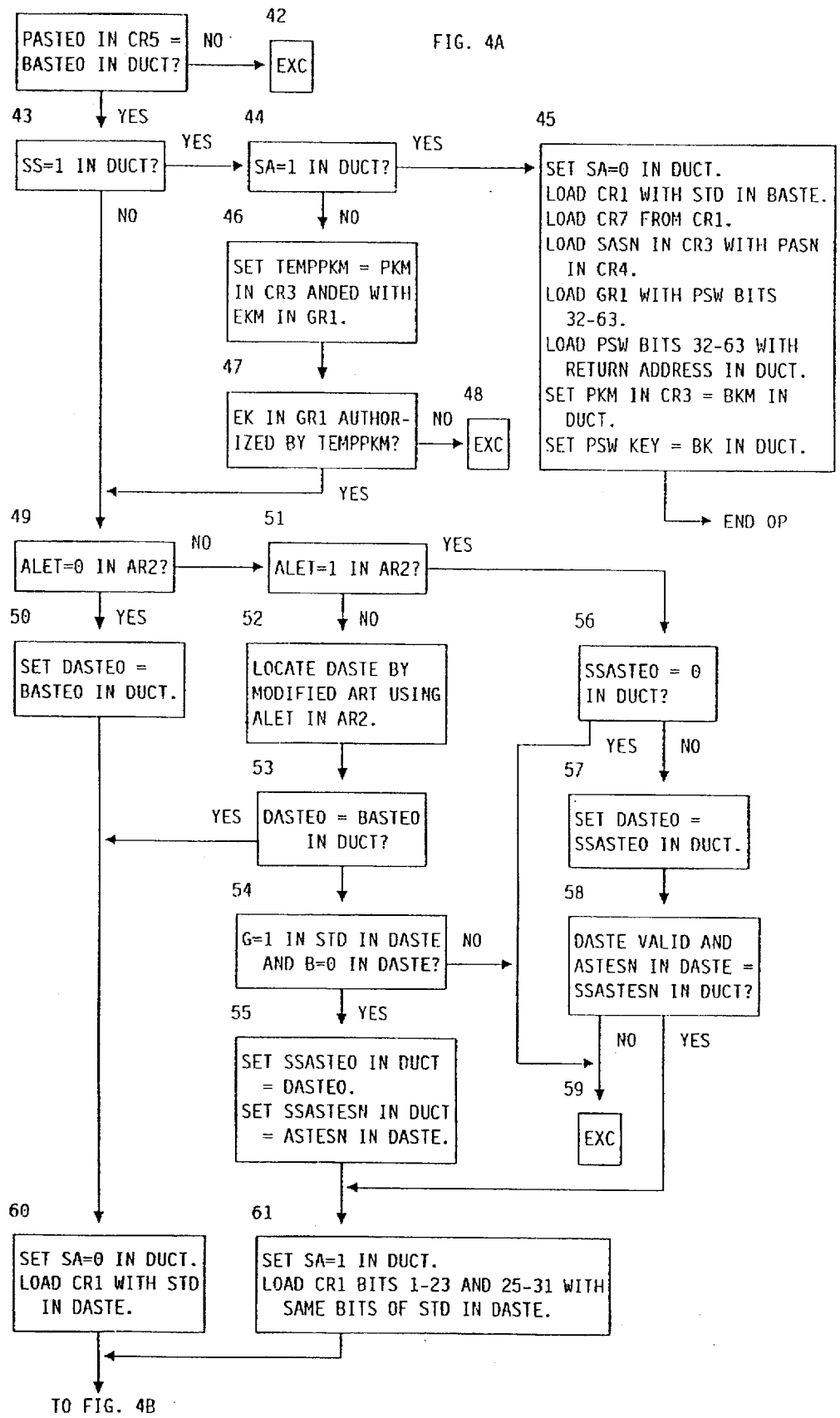

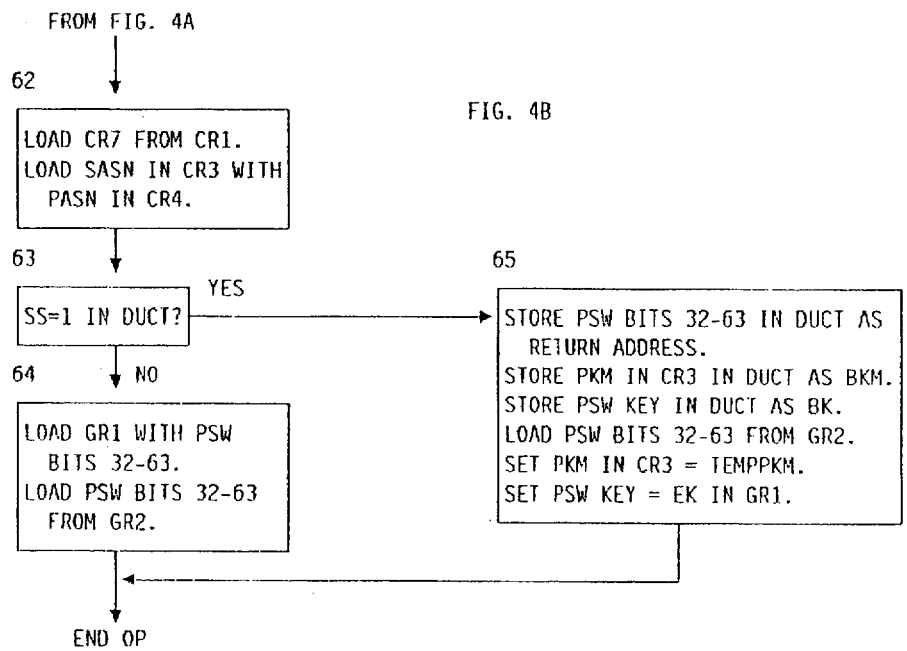
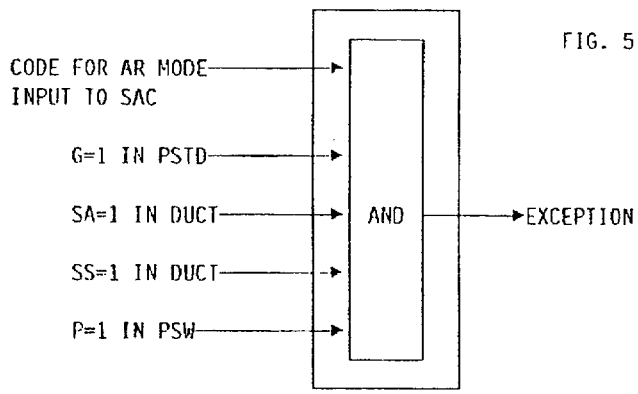
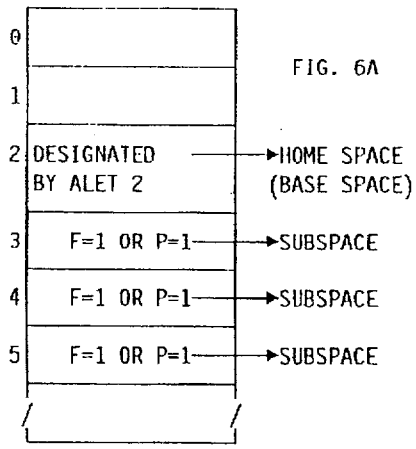
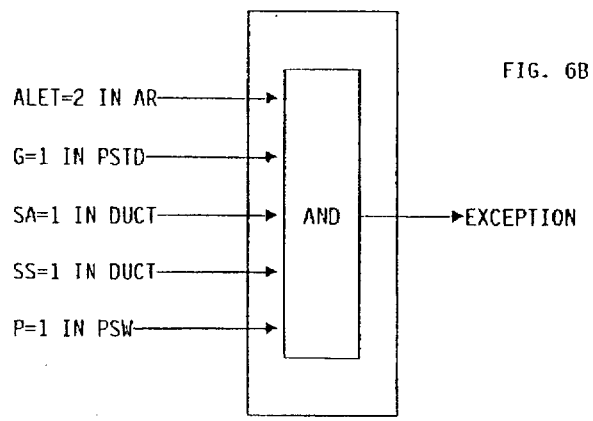

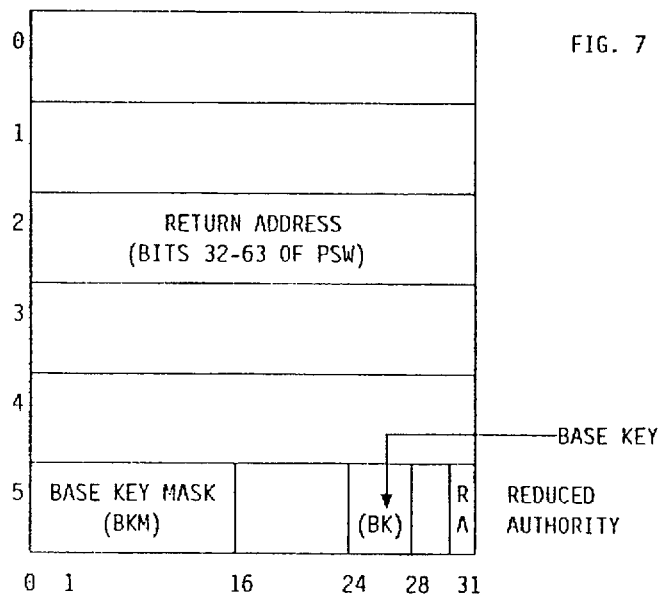
FIG. 7
FIG. 8A
FIG. 8B

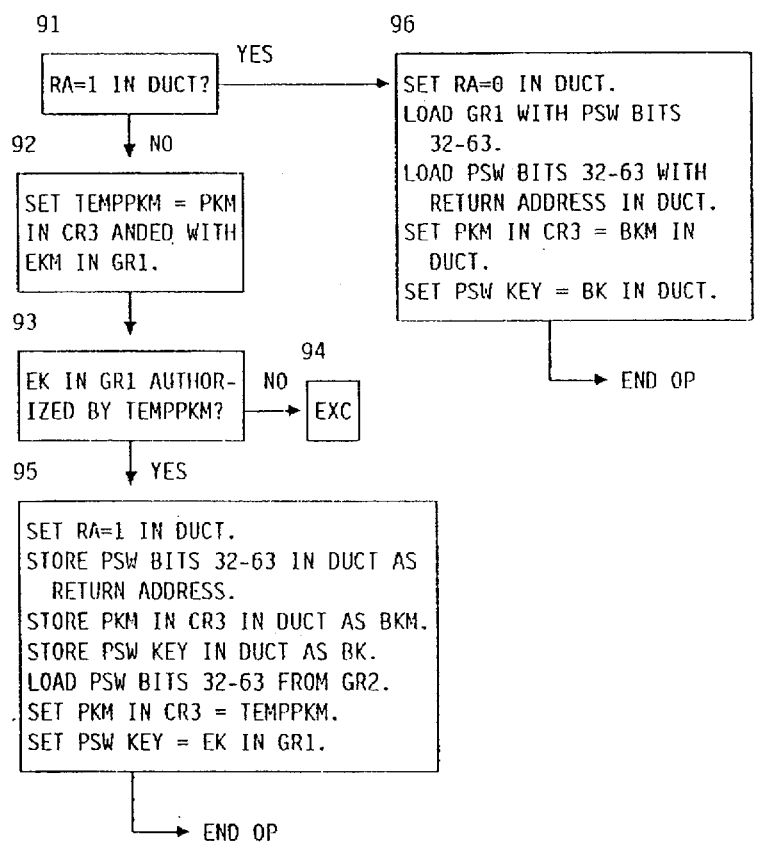

AUTHORITY REDUCTION AND RESTORATION METHOD PROVIDING SYSTEM INTEGRITY FOR SUBSPACE GROUPS AND SINGLE ADDRESS SPACES DURING PROGRAM LINKAGE

GENERAL BACKGROUND

In a computer system, an "address space" is a set of byte addresses that somehow address and allow access to real (physical) storage. The addresses may be real addresses that directly address the storage, or they may be virtual addresses that are translated by some means to real addresses. For example, in the IBM Enterprise Systems Architecture/390 (ESA/390) architecture, described in the ESA/390 Principles of Operation manual (Form No. SA22-7201-02), virtual storage is composed of 1M-byte segments in turn composed of 4K-byte pages, a segment table designation (STD) in a control register of a CPU (central processing unit) contains the origin address and length of a segment table, a segment table entry contains the origin address and length of a page table, and a page table entry contains the real address of 4K-byte page frame, also called a block, of real storage to which a page of virtual storage is mapped; and a virtual address is translated to a real address by using portions of it as indexes to locate first a segment table entry and then a page table entry to obtain the page frame real address from the page table entry. This translation of a virtual address to a real address is called dynamic address translation (DAT).

Hereinafter, we will assume that DAT is on, and "address space" will mean a virtual address space, which is an address space composed of virtual addresses.

The ESA/390 architecture provides that the CPU can be in any one of four translation modes, as specified by two bits in the PSW (program status word) of the CPU. The current translation mode determines the address space from which instructions are fetched and the address space from which storage operands are fetched or in which they are stored, as follows:

| Translation Mode | Instruction Space | Operand Space |
| --- | --- | --- |
| Primary-space | Primary | Primary |
| Secondary-space | Primary | Secondary |
| Access-register | Primary | AR-specified |
| Home-space | Home | Home |

The primary, secondary, and home address spaces are specified by a primary STD (PSTD), a secondary STD (SSTD), and a home STD (HSTD), respectively, all of which are in control registers; that is, those STDs in the control registers are the ones that are used by DAT to translate references to the corresponding address spaces. The STD for an AR-specified address space will be described later.

The instruction Set Address Space Control (SAC) can be used to switch between the translation modes. The home-space mode is for use by the control program of the operating system (the home address space is where the control program initiates a job step and keeps the control blocks for the step), and SAC can be used to set the home-space mode only when the CPU is in the privileged supervisor state, as determined by a bit in the PSW. The alternative to the supervisor state is called the problem state. An application program is executed in the problem state.

An address space may be identified by a number called an address space number (ASN). The primary address space and secondary address space are identified by a primary ASN (PASN) and a secondary ASN (SASN), respectively, both of which are in control registers.

The ESA/390 architecture provides storage protection by means of a storage key, containing four access control bits and a fetch protection bit, assigned to each 4K-byte block of real storage and also a four-bit access key in the PSW (program status word) of the CPU. When a reference is made to a block, if the access key in the PSW is zero or matches the access control bits in the storage key of the block, a storage access to the block is permitted; otherwise, when the access key is not zero and does not match the access control bits in the storage key, a store access is prevented, and both a store access and a fetch access are prevented if the fetch protection bit in the storage key is one. (The term "storage key" is usually used to refer to just the four access control bits in the actual storage key, not also the fetch protection bit. An actual storage key also includes change and reference bits that are irrelevant here.)

Control registers, segment and page tables, the PSW access key, and storage keys are "secure," meaning that they can be changed by the control program of the operating system but not by an application program, except as otherwise described herein.

Registers, tables, or operations that are called "secure" provide what is called "system integrity." "System integrity" is the ability of a computer system to operate in accordance with its published specifications despite any attempt by a malicious program to cause it to do otherwise.

U.S. Pat. No. 4,366,537 to Andrew R. Heller, et al, issued Dec. 28, 1982, assigned to the same assignee as the present invention, discloses a 16-bit PSW key mask (PKM) in a control register of the CPU and also a Set PSW Key From Address instruction (SPKA). SPKA places a specified access key in the PSW provided that the bit in the PKM corresponding to the value of the access key (0–15) is one. A program can use SPKA to change its PSW access key, as authorized by its PKM, so as to access different storage blocks having different storage keys.

U.S. Pat. No. 4,366,537 also discloses a Program Call instruction (PC) and a Program Transfer instruction (PT). PC transfers control usually in a calling linkage from a lowly authorized program to a more highly authorized program, where the two programs are usually in different address spaces. PT performs a corresponding return linkage.

PC uses a specified program-call number and a secure table structure to locate an entry table entry (ETE) by a process called PC-number translation. The ETE contains an address space number (ASN), an entry instruction address, and a 16-bit entry key mask (EKM). PC uses the ASN and a secure table structure to locate an ASN second table entry (ASTE), by a process called ASN translation, from which it obtains a segment table designation (STD) that specifies the target primary address space. PC places the obtained ASN and STD in control registers as the new PASN and PSTD, respectively; obtains an authorization index (AX) from the ASTE and places it in another control register; ORs the EKM in the ETE into the PSW key mask (PKM) in a control register, which can increase the authority provided by the PKM; and transfers control to the entry instruction address in the new (target) primary address space. Before transferring control, PC saves (places) the original PASN and PKM and also a return address (the address of the next sequential instruction after the PC) in general registers (which are not secure). It should be understood that only those contents of the ETE and operations of PC are described which are relevant here.

PT uses the general register contents (PASN, PKM, and return address) saved by PC. PT uses the saved PASN (saved in a general register) to locate an ASTE; checks that the program in the current space is authorized to use PT to transfer control to the space represented by the ASTE (by using the AX in a control register to test a bit in a secure authority table pointed to from the ASTE); obtains an STD and AX from the ASTE and places them and the saved PASN in control registers (the saved PASN as the new PASN, and the obtained STD as the new PSTD); and transfers control to the return address in the new (restored) primary address space. PT also ANDs the saved PKM into the PKM in a control register, which can reduce the authority provided by the PKM.

U.S. Pat. No. 4,979,098 to Richard I. Baum, et al, issued Dec. 18, 1990, assigned to the same assignee as the present invention, discloses access registers, the access-register mode (mentioned above as one of the four translation modes), and access-register translation (ART), which is a process for translating the contents of an access register to obtain an STD for use by DAT. An access register is paired with each of the general registers 0–15. An access register is said to contain an access list entry token (ALET). In the access-register mode when a general register contains or is used to form the address of a storage operand, ART uses the ALET in the paired access register as an index to locate an entry in a secure access list, obtains an ASN second table entry (ASTE) address from the access list entry, and obtains the STD to be used by DAT from the ASTE. ART does not use an address space number (ASN). Various authorization checks are performed during ART. One of these is the comparison of an ASTE sequence number (ASTESN) that is in the access list entry to an ASTESN that is in the ASTE. An exception is recognized if the two ASTESNs are not equal. The ASTESN method allows the ability to use an access list entry to access an address space to be revoked simply by changing (normally incrementing by one) the ASTESN in the ASTE.

An address space containing programs normally has an ASN so ASN translation can be done by PC and PT to locate the ASTE for the space. If an address space contains only data, as it may when it is designated from an access list, it need not have an ASN. Such a space is called a data space. There is an ASTE for a data space, but this ASTE need not be in the table structure indexed by ASNs, and it is sometimes called a "pseudo ASTE."

U.S. Pat. No. 4,979,098 also discloses placement by the Program Call instruction (PC) and Program Transfer instruction (PT) of the address of the ASTE for the new primary address space in a control register. This ASTE is called the primary ASTE (PASTE). The patent also discloses a secure dispatchable unit control table (DUCT), whose address is placed in a control register by the control program of the operating system. A DUCT is associated with the current dispatchable unit (process or task). The PASTE contains the address of an access list called the primary space access list (PSAL). The DUCT contains the address of an access list called the dispatchable unit access list (DUAL). During ART, a bit in the ALET selects which of the PSAL and DUAL is to be used by ART.

U.S. Pat. No. 5,220,669 to Richard I. Baum, et al, issued Jun. 15, 1993, assigned to the same assignee as the present invention, discloses a linkage stack, a variation of the Program Call instruction (PC) called stacking PC, and a Program Return instruction (PR). A bit in the entry table entry (ETE) used by PC specifies whether PC is to perform its basic (nonstacking) operation or the stacking operation. Stacking PC saves status in a secure linkage stack pointed to from a control register. PR is used instead of the Program Transfer instruction (PT) and restores status from the linkage stack. PR does ASN translation on a PASN saved in the stack to locate the primary ASTE (PASTE) to be restored.

Stacking PC uses a bit in the ETE that specifies whether the entry key mask (EKM) in the ETE is to be ORed to the PSW key mask (PKM) in a control register or is to replace the PKM in the control register. Replacement instead of ORing allows greater variation, even a reduction, in the new authority provided by the PKM. In either case, stacking PC saves the original PKM in the linkage stack, and PR restores it to the control register during the return linkage. Stacking PC uses another bit in the ETE that specifies whether the PSW access key is to be left unchanged or replaced from a field in the ETE. Again, stacking PC saves the original access key in the linkage stack, and PR restores it.

CICS AND SUBSPACE-GROUP BACKGROUND

The IBM Customer Information Control System (CICS) is a subsystem that uses the ESA/390 architecture. CICS has a control program that supports multithreaded execution of application programs that process transactions. Each thread is the execution of an application program for the processing of one transaction, and the execution normally creates transaction data that is related to the one transaction.

The original design of CICS placed the control program, all application programs, and all transaction data in one address space having the same storage key throughout the address space. All programs were executed with the same PSW access key, which was equal to the common storage key. This design provided the benefits that control could quickly be transferred between the control program and application programs by means of simple branch instructions and the PSW access key never needed to be changed, but it diminished reliability because an erroneous application program processing one transaction could make an erroneous store into data for another transaction, into another application program, or even into the control program.

U.S. Pat. No. 5,163,096 to Carl E. Clark, et al, issued Nov. 10, 1992, assigned to the same assignee as the present invention, discloses a method that improves CICS reliability. The patent discloses a public storage key which, when assigned to a block of storage, causes the block to have no storage protection regardless of the PSW access key. Key 9 was chosen as the public storage key in the ESA/390 architecture.

When the public storage key is included in its design, the CICS control program is placed in key-8 storage; the application programs and transaction data are placed in key-9 storage; the control program is normally executed with PSW key 8, which allows it to store into both the key-8 storage and the key-9 storage; and the application programs are executed with PSW key 9, which allows them to store into only key-9 storage. Thus, an application program can store into all transaction data and even other application programs but not into the control program. The control program is protected from erroneous stores by application programs, but the application programs and transaction data are not so protected.

The above improved design of CICS requires use of the PSW key mask (PKM) (in a control register) and the Set PSW Key From Address instruction (SPKA). In this design, the PKM permanently authorizes the setting of PSW keys 8 and 9, and the control program uses SPKA to switch from PSW key 8 to PSW key 9 before transferring control to an application program and then back to key 8 when control is returned from the application program.

The improved design of CICS increases reliability, meaning avoidance or detection of errors, but it does not provide system integrity, meaning protection against a malicious application program. Since the PKM always authorizes key 8 and key 9, an application program can at any time use SPKA to set the PSW access key to 8 and then perform a damaging store into the control program.

The IBM Airline Control System (ALCS), AKA TPF/MVS (Transaction Processing Facility/Multiple Virtual Storage), is similar to CICS but has a design that does provide system integrity with respect to protection of the control program from application programs. This design was made before the advent of the stacking Program Call instruction (PC) and the public storage key.

In ALCS, everything is in one address space, the control program is in key-7 storage, and the application programs and transaction data are in key-8 storage. The control program is executed with a PKM authorizing PSW keys 7 and 8, and the control program uses SPKA to switch the PSW key between 7 and 8 as necessary. The application programs are executed with a PKM authorizing only PSW key 8 and only with a PSW key of 8. The control program, after using SPKA to set key 8, uses a Program Transfer instruction (PT) to give control to an application program and reduce the PKM to authorizing only key 8. An application program returns to the control program by means of a Program Call instruction (PC) that restores, by means of an entry table entry (ETE), the PKM to authorizing keys 7 and 8. There is no way for an application program to obtain PSW key 7. Therefore, there is no way for an application program to damage the control program.

An application program may use PC to transfer control to the control program to request any of a variety of services. The PC is always to the same entry point, and a specific service is requested by means of a code placed by the application program in a general register.

CICS now has further improved its reliability through use of the subspace-group facility, which is disclosed in U.S. Pat. No. 5,361,356 to Carl E. Clark, et al, issued Nov. 1, 1994 assigned to the same assignee as the present invention. The entire contents of U.S. Pat. No. 5,361,356 are incorporated herein by this reference.

A subspace group is a group of related address spaces with one of the spaces called a base space and the others called subspaces. It is intended that the subspaces each include a different subset of the pages in the base space. As for any virtual address space, the base space and subspaces each is specified by a unique segment table in which the entries point to page tables. A segment of virtual storage is shared between two or more address spaces if the identically indexed segment table entries in the segment tables for the spaces point to the same page table. A segment is unique to a space if its page table is pointed to only from the segment table for the space. These simplified statements assume that individual pages within a nonshared segment are not shared between spaces, which is normally the case.

CICS uses a subspace for each transaction; the transaction data is in the subspace. Application programs may be in virtual pages shared among the subspaces, and different sets of subspaces may each contain different sets of application programs. The base space relates all of the subspaces, that is, any storage that is in any subspace is also in the base space (any page table pointed to from the segment table for any subspace is also pointed to from the segment table for the base space). The control program is in the base space and all subspaces. The control program is protected from the application programs through use of the public storage key. Application programs and transaction data are protected from application programs through the use of subspaces. When an application program is being executed in one subspace to process the data for the transaction in that subspace, it cannot damage any other application program that is not also in the subspace, and it cannot damage the data of other transactions because all those other transactions and their data are in other subspaces.

Subspaces are made practicable because U.S. Pat. No. 5,361,356 discloses a Branch in Subspace Group instruction (BSG) that quickly transfers control between a base space and subspaces. The alternative to BSG would be a Program Call instruction (PC) and either a Program Transfer instruction (PT) or a Program Return instruction (PR), which would be too time consuming because of PC-number translation, address space number (ASN) translation, and numerous authority checks.

BSG has a four-bit R1 field and a four-bit R2 field. The contents of the R2 field designate a general register (the R2 general register) and the paired access register (the R2 access register). The contents of the R1 field designate a general register (the R1 general register). The R2 general register contains a branch address, and the R2 access register contains an access list entry token (ALET). BSG transfers control (branches) to the branch address in an address space specified by the ALET. BSG loads the R1 general register with a return address, which is the address of the next sequential instruction after the BSG. BSG does not provide an indication of the address space from which it transferred control. BSG performs other functions also, as will be described. ("Branch" usually refers only to a simple change of the instruction sequence within a single address space. A branch is performed by changing the instruction address in the PSW, which is the address of the next instruction to be executed. "Transfer control" can have the broader meaning that not only is the instruction address changed but also the next instruction to be executed is in a different address space. "Branch" in "Branch in Subspace Group" has the broader meaning of "transfer control.")

In order for a dispatchable unit (DU, a process or task) to use BSG to branch to a subspace, the DU must have available to it an access list that contains an entry corresponding to the subspace. The access list, which may be either the dispatchable-unit access list or the primary-space access list, must have an entry for each subspace to which the DU will branch. The access list may also contain an entry for the base space of the subspace group, but, as will be described, the base space can be branched to without using an access list entry.

BSG branches only between (or within) address spaces that are included in a subspace group. BSG does so with a minimum of authorization checking, which improves its performance. BSG uses the theory that all address spaces in a subspace group are equally authorized, and this authorization is represented by the contents of the ASN second table entry (ASTE) for the base space of the group. Whenever control is in either the base space or a subspace of a subspace group, the primary ASTE (PASTE) address in a control register is that of the ASTE for the base space, and the primary ASN (PASN) and authorization index (AX) in control registers are those of the base space. The subspaces do not have ASNs. They do have ASTEs, and important contents of a subspace ASTE are the segment table designation (STD) that specifies the space and an ASTE sequence number (ASTESN) for the space. The ASTEs for subspaces are another case of the "pseudo ASTEs" that exist for data spaces, even though subspaces do contain programs.

The operation of BSG will now be described in more detail.

BSG begins by checking that it is being executed in an address space that is in a subspace group associated with the current dispatchable unit (DU). A DU can be associated with only one subspace group. A DU becomes associated with a subspace group if and when the control program of the operating system places in the DU control table (DUCT) for the DU the address of an ASTE that represents the base space of the subspace group, which address is called the base ASTE origin (BASTEO). A DUCT is a secure table that is associated with a single DU and pointed to from a control register. BSG checks that the BASTEO in the DUCT is equal to the address, in a control register, of the current primary ASTE (PASTE), which address is called the primary ASTE origin (PASTEO). If the BASTEO in the DUCT is not equal to the PASTEO in a control register, BSG is not being executed in an address space of the subspace group associated with the DU, and BSG therefore recognizes an exception and ends operation.

If BASTEO equals PASTEO, BSG tests the access list entry token (ALET) in access register R2 for being other than 00000000 hex, called ALET 0, and 00000001 hex, called ALET 1. If the ALET is neither ALET 0 nor ALET 1, BSG uses it and a modified form of access-register translation (ART) (modified in that it performs fewer authority checks) to locate first an access list entry and then an ASTE pointed to from the access list entry. This ASTE is called the destination ASTE (DASTE), and its address is called the DASTE origin (DASTEO).

The modified ART omits checking that an access list entry sequence number (ALESN) in the ALET is equal to an ALESN in the located access list entry, and it ignores a private bit and a fetch-only bit in the access list entry. (The private bit causes certain authorization checking to occur, and the fetch-only bit causes the entry to be usable for performing fetch accesses but not store accesses.) As in ordinary ART, the ASTE designated from the access list entry is tested for being valid and for having an ASTE sequence number (ASTESN) equal to an ASTESN in the access list entry.

If the DASTEO obtained by ART equals the BASTEO in the DUCT, BSG loads the segment table designation (STD) in the DASTE into a control register as the primary STD (PSTD), and it sets a subspace-active indicator bit (SA) in the DUCT to zero, indicating that control (instruction sequencing) for the DU is being transferred to the base space. BSG then places the return address (the address of the next sequential instruction after the BSG) in general register R1, branches to the branch address provided in general register R2, and ends operation.

If DASTEO does not equal BASTEO, BSG performs two checks. First, it checks a subspace-group indicator bit (G) in the STD in the DASTE for being one, which value of G indicates that the represented address space is in a subspace group. If G is zero, the space represented by the DASTE is not in a subspace group, and BSG recognizes an exception. Second, when G is one, BSG checks a base-space indicator bit (B) in the DASTE for being zero, which value of B indicates that the represented address space is a subspace because it is in a subspace group and is not a base space. If B is one, the address space represented by the DASTE is a base space, and, since it is known that it is not the base space for the current DU because DASTEO does not equal BASTEO, BSG recognizes an exception.

If BSG recognizes an exception because of either of the above two checks, it ends operation. If no exception is recognized, BSG performs as follows. BSG (1) loads the segment table designation (STD) in the DASTE into a control register as the primary STD (PSTD); (2) sets the subspace-active indicator bit (SA) in the DUCT to one, indicating that control (instruction sequencing) for the DU is being transferred to a subspace; (3) saves the destination ASTE origin (DASTEO) in the DUCT as a value called the subspace ASTE origin (SSASTEO); and (4) saves the ASTE sequence number (ASTESN) that is in the DASTE in the DUCT as a value called the subspace ASTESN (SSASTESN). BSG then places the return address (the address of the next sequential instruction after the BSG) in general register R1, branches to the branch address provided in general register R2, and ends operation.

The special case of ALET 0 in access register R2 is a directive for BSG to transfer control to the base space in a faster way. ALET 0 causes BSG to obtain the base ASTE origin (BASTEO) from the DUCT (it could just as well obtain the primary ASTE origin, PASTEO, from a control register since the BASTEO and PASTEO are known to be equal), obtain an STD from the designated ASTE (the base space ASTE), place the STD in a control register as the primary STD (PSTD), and set the subspace-active indicator bit (SA) in the DUCT to zero. As usual, BSG places the return address in general register R1 and branches to the branch address provided in general register R2.

The special case of ALET 1 in access register R2 is a directive for BSG to transfer control to the subspace that last had control, if any. ALET 1 causes BSG to obtain the subspace ASTE origin (SSASTEO) from the DUCT, check that the subspace ASTE sequence number (SSASTESN) that is in the DUCT is equal to the ASTESN that is in the subspace ASTE (the ASTE designated by the SSASTEO), obtain an STD from the subspace ASTE, place the STD in a control register as the PSTD, and set the subspace-active indicator bit (SA) in the DUCT to one. As usual, BSG places the return address in general register R1 and transfers control to the branch address provided in general register R2. However, BSG recognizes an exception and immediately ends operation if the SSASTEO is all zeros because this indicates that control has never before been transferred to a subspace.

Note that although BSG saves a return address in general register R1, it nowhere saves a return ALET, that is, it does not save any indication of the space from which it transfers control. However, the SSASTEO in the DUCT, which is set when a subspace is entered, indicates which subspace last had control, and ALET 1 allows making use of the SSAS-TEO.

Note that in all of its operations, BSG never changes the primary ASTE origin (PASTEO), authorization index (AX), or PSW key mask (PKM) in control registers. It also never changes the PSW access key. The constancy of those values reflects the fact that all address spaces in a subspace group are equally authorized.

The BSG operations described above are shown, in FIG. 1, which also shows some details that have not been described, as follows. When ALET 1 is used, the destination ASTE (DASTE) is tested for being valid; it is valid if bit 0 of word 0 in it is zero. When the PSTD is replaced from a subspace ASTE, bits 0 and 24 of the PSTD are left unchanged since these specify attributes of the base space that should apply also to a subspace. BSG sets the secondary ASN (SASN) and the secondary STD (SSTD) equal to the primary ASN (PASN) and primary STD (PSTD), respectively, so the called program cannot access the calling program in the secondary space. The instruction address in the PSW is in bit positions 33–63, and an addressing-mode bit, which selects between the 24-bit and 31-bit addressing modes, is in bit position 32. BSG manipulates the addressing-mode bit along with the instruction address.

The subspace-group facility includes changes to the Program Call instruction (PC), Program Transfer instruction (PT), and Program Return instruction (PR). When any of those instructions gives control to any address space in a subspace group, it does so through use of the address space number (ASN) of the base space of the group. After the instruction has placed the STD for the base space in a control register as the PSTD, then, if the dispatchable unit is subspace active, as indicated by SA in the DUCT, and if the SSASTESN in the DUCT equals the ASTESN in the subspace ASTE (the ASTE designated by the SSASTEO in the DUCT), the instruction replaces bits 1–23 and 25–31 of the PSTD with the corresponding bits of the STD in thee subspace ASTE.

The subspace-group facility provides reliability by allowing the transaction data for each transaction to be in a different subspace, but it does not provide system integrity. There are two impediments to the provision of system integrity, as follows.

First, an application program in a subspace can use BSG with ALET 0 to transfer control to the base space while providing a branch address in BSG's general register R2 that causes branching to malicious instructions that are included in the application program. Since the application program now is being executed in the base space, it has access to the complete contents of the base space, which contents include all storage areas of all subspaces because all those storage areas are included in the base space (so that a control program in the base space can access them as well as storage areas that are uniquely in the base space).

Second, an application program in a subspace can use the S/390 Set Address Space Control (SAC) instruction to enter the access-register mode, which mode allows the program to access data in any address space available to it through an access list (either the primary space access list or the dispatchable unit access list). Since there is an entry for every subspace on the dispatchable unit access list, an application program in any subspace has access in the access-register mode to all subspaces.

The second impediment cannot be circumvented just by means of the private or fetch-only bits in an access list entry, at least not if the IBM MVS/ESA operating system is used. That operating system (1) has an entry for the home address space on the dispatchable-unit access list, (2) cannot tolerate the private or fetch-only bit being one in that entry, and (3) provides that the home address space of a DU is the same address space as the base space of the DU if the DU is associated with a subspace group.

SUMMARY OF THE INVENTION

It is an object of this invention to modify the subspace group operation in a unique manner that provides a more secure subspace group operation that prevents even a malicious application program from being able to affect system integrity when operating within a subspace group. (The prior subspace group operation could prevent an erroneously operating application program from affecting system integrity, but could not prevent a malicious application program from affecting system integrity when operating within a subspace group.)

It is a further object of this invention to provide the secure subspace-group method as an optional addition or change to the subspace-group method, so that subsystems currently using a subspace group are unaffected when they do not need the secure method or cannot meet requirements of the secure method. This object is obtained by providing a control bit, called the subspace-security control bit (SS), that the Branch In Subspace Group instruction (BSG), as modified by this invention, tests to determine if the secure method is to be used. In the preferred embodiment of the invention, SS is placed in the secure dispatchable unit (DU) control table (DUCT).

It is another object of this invention to enhance (provide a necessary condition for) system integrity by ensuring that an application program in a subspace of a secure subspace group cannot use BSG to branch to either another subspace or the base space and yet retain control within the application program. This object is obtained by ensuring that the application program can only branch to a "controlled address" (which can be assured to be an address not within the application program) in the base space. The controlled address is the return address established by a BSG instruction in the base space that branched to the subspace. This address is a controlled address because BSG saves it in the secure DUCT.

It is another object of this invention to further enhance (provide another necessary condition for) system integrity by ensuring that an application program in a subspace of a secure subspace group cannot use the access-register mode and access list entries designating other subspaces, which entries must exist for use by BSG, to store in those other subspaces. This object is obtained by either of two methods. In the first method, the Set Address Space Control (SAC) instruction is changed so that it cannot set the access-register mode when it is executed in the problem state in a subspace of a secure subspace group. In the second method, the prior-art fetch-only bit in the access list entries used by BSG is set to one (which prevents stores through use of the entries), and ordinary access-register translation (ART) (which is used to perform data accesses) is changed so that an access list entry token (ALET) having the value 00000002 hex, called ALET 2 and which specifies the home address space, cannot be used in the problem state in a subspace of a secure subspace group.

ALET 2 designates entry 2 on the dispatchable unit access list. This entry is used, by convention, by MVS/ESA to access the home address space. Also by MVS convention, the home address space is the base space. It is not practicable to set the fetch-only bit (or the private bit) to one in the entry designated by ALET 2, and, therefore, that entry would be a way to store in the base space.

The first method may be the more easily implementable method and is for use when the application program does not need to use the access-register mode. The second method can be modified by using the private bit in an access list entry instead of the fetch-only bit.

It is another object of this invention to further enhance (provide another necessary condition for) system integrity by ensuring that an application program in a subspace of a secure subspace group cannot obtain a PSW access key that allows it to store in the parts of the subspace that have a storage key different from that had by the application program and its transaction data. This object is obtained by: (1) during the execution of a BSG in the base space (the subspace-active indicator bit, SA, in the DUCT is zero), an entry key mask (EKM) in general register R1 is ANDed with the PSW key mask (PKM) in a control register, which can decrease the authority provided by the PKM; (2) during the same execution, the original PKM is saved as a base key mask (BKM) in the DUCT; and (3) during the execution of a BSG in a subspace (SA is one), the PKM in a control register is restored to the value of the BKM in the DUCT. For example, a control program can execute in the base space with a PKM authorizing PSW access keys 8 and 9, a BSG from the base space to a subspace can reduce the PKM to authorizing only access key 9, and then a BSG from the subspace back to the base space can restore the PKM to authorizing 8 and 9.

It is another object of this invention to improve system performance by eliminating executions of the Set PSW Key From Address (SPKA) instruction. It is yet another object to allow BSG to be executed within a fetch-protected program. Both of these objects are obtained by: (1) during the execution of a BSG in the base space, an entry key (EK) in general register R1 is placed in the PSW as the PSW access key, provided that this access key is authorized by the new PKM set as described in the preceding paragraph; (2) during the same execution, the original PSW access key is saved as a base key (BK) in the DUCT; and (3) during the execution of a BSG in a subspace, the access key in the PSW is restored to the value of the BK in the DUCT. For example, a control program can execute in the base space with PSW access key 8, a BSG from the base space to a subspace can change the PSW access key to 9, and then a BSG from the subspace back to the base space can restore the PSW access key to 8.

An alternative to the method in the preceding paragraph would be to have an SPKA instruction immediately before the BSG that branches to the subspace and then another SPKA instruction at the return address, but this would require execution of two additional instructions, and it would be impossible if the control program were in fetch-protected storage in the base space because, after the first SPKA was executed, the BSG that branches from the base space could not be fetched, and the second SPKA, the one at the return address, also could not be fetched.

The secure subspace-group facility is concisely contrasted to the prior art as follows.

The prior-art Branch In Subspace Group instruction (BSG) uses an ALET in access register R2 and a branch address in general register R2, and it places a return address in general register R1. ALET 0 designates the base space, and ALET 1 designates the last entered subspace. The definition does not depend on whether BSG is executed in a subspace or in the base space. (Although not previously explicity stated, a BSG can branch not only from the base space to a subspace and vice versa but also within the base space, within a subspace, and from a subspace to another subspace.)

In contrast, when the BSG of this invention is executed in the base space (SA=0 in the DUCT) in a secure subspace group (SS=1 in the DUCT): (1) the return address is saved in the DUCT instead of in general register R1, (2) the PSW key mask (PKM) and PSW access key are saved in the DUCT, (3) an entry key mask (EKM) in general register R1 is ANDed to the PKM in a control register, and (4) an entry key (EK) in general register R1 is placed in the PSW as the PSW access key, provided this is authorized by the new PKM. There is no change to the use of access register R2 and general register R2 when SA=0 and SS=1.

Continuing the contrast, when the BSG of this invention is executed in a subspace (SA=1 in the DUCT) in a secure subspace group: (1) ALET 0, which specifies a branch to the base space, is used instead of the contents of access register R2, (2) the return address in the DUCT is used instead of the contents of general register R2, and (3) the PKM in a control register and the PSW access key are restored from the DUCT. There is no change to the loading of general register R1 with a return address. Access register R2 and general register R2 are ignored when SA=1 and SS=1.

It is a final object of this invention to make the novel method of a secure subspace group provide system integrity even when a subspace group is not used, meaning within a single address space when BSG is not used. This objective is obtained by means of a new instruction called the Branch and Set Authority instruction (BSA), which is described as follows.

BSA uses an R1 general register and an R2 general register whose contents are the same as the same registers of BSG. BSA does not use an R2 access register. BSA uses a new bit in the DUCT called the reduced-authority indicator bit (RA). A DU is said to be in the base-authority state when RA is zero or in the reduced-authority state when RA is one. BSA sets and uses a return address, a base key mask (BKM), and a base key (BK) in the DUCT the same as BSG.

When BSA is executed in the base-authority state (RA=0 in the DUCT): (1) the return address is saved in the DUCT, (2) the PSW key mask (PKM) and PSW access key are saved in the DUCT as the BKM and BK, respectively, (3) an entry key mask (EKM) in general register R1 is ANDed to the PKM in a control register, (4) an entry key (EK) in general register R1 is placed in the PSW as the PSW access key, provided this is authorized by the new PKM, (5) RA in the DUCT is set to one, and (6) a branch is made to the branch address provided in general register R2.

When BSA is executed in the reduced-authority state (RA=1 in the DUCT): (1) the return address in the DUCT is used as the branch address, (2) the PKM in a control register and the PSW access key are restored from the DUCT, (3) RA in the DUCT is set to zero, and (4) general register R1 is loaded with a new return address. General register R2 is ignored when RA=1. The loading of general register R1 with a new return address is not a necessary part of this invention and is simply a possibly useful action.

The IBM Airline Control System (ALCS), described previously, is an example of a subsystem that can profitably use the Branch and Set Authority instruction (BSA). The ALCS control program would be executed in the base-authority state and would use BSA instead of the Program Transfer instruction (PT) to give control to an application program. The application program would be executed in the reduced-authority state and would use BSA instead of the Program Call instruction (PC) to give control to the control program. The use of BSA instead of PC and PT would improve system performance.

It can be seen that the method of the secure Branch in Subspace Group instruction (BSG) or the novel Branch and Set Authority instruction (BSA) of this invention can apply to other types of authority besides the PSW key mask (PKM) and the PSW access key. For example, the method could be used to reduce the supervisor state to the problem state during a calling linkage and then restore the supervisor state during the return linkage.

BRIEF DESCRIPTION OF THE DRAWINGS

FIG. 3A shows the registers when the subspace-security control bit (SS) in the DUCT is zero, FIG. 3B when SS is one and the subspace-active indicator bit (SA) is zero, and FIG. 3C when SS and SA are both one.

FIGS. 4A and 4B show the operation of BSG in accordance with this invention.

FIG. 5 shows a first method of preventing access list entries that designate subspaces from being used to access data in the subspaces. The method prevents entry into the access-register mode.

FIGS. 6A and 6B show a second method of preventing access list entries that designate subspaces from being used to access data in the subspaces. The method uses the prior-art fetch-only or private bit in an access list entry, and it changes access-register translation (ART) so ALET 2 cannot be used in a secure subspace to access the base space.

FIG. 7 shows the contents of the dispatchable unit control table (DUCT) used by the Branch and Set Authority instruction (BSA) of this invention.

FIGS. 8A and 8B show the contents of the registers designated and used by the BSA of this invention. The figures show the contents of general register R1 before the execution of BSA and the contents after the execution. The figures also show the unchanging contents of general register R2 both before and after the execution. FIG. 8A shows the registers when the reduced-authority indicator bit (RA) in the DUCT is zero and FIG. 8B when RA is one.

FIG. 9 shows the operation of BSA in accordance with this invention.

DETAILED DESCRIPTION OF THE EMBODIMENT

Figure 1:
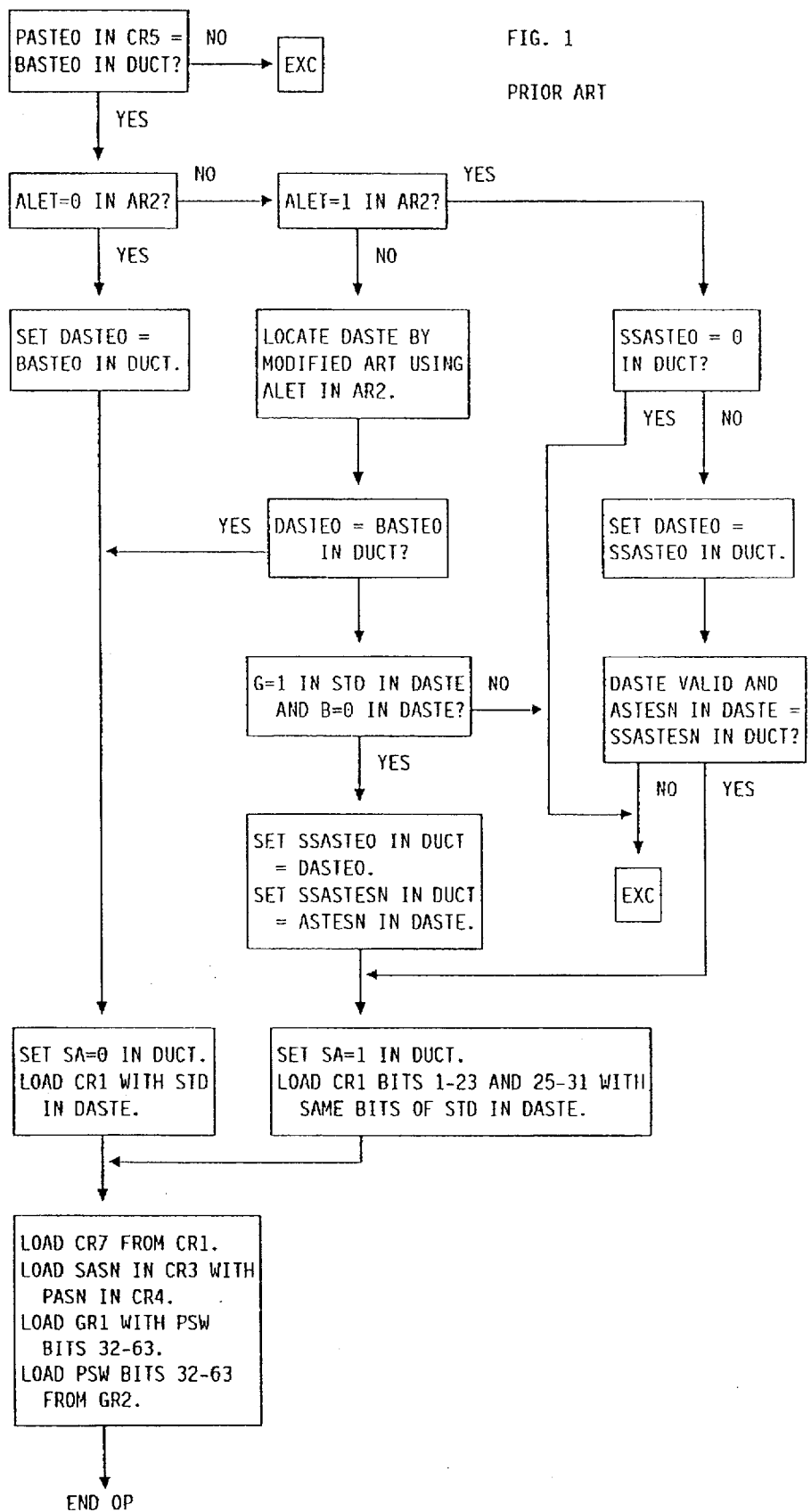
FIG. 1 shows the prior-art operation of the Branch In Subspace Group instruction (BSG) and has already been described.
Figure 2:
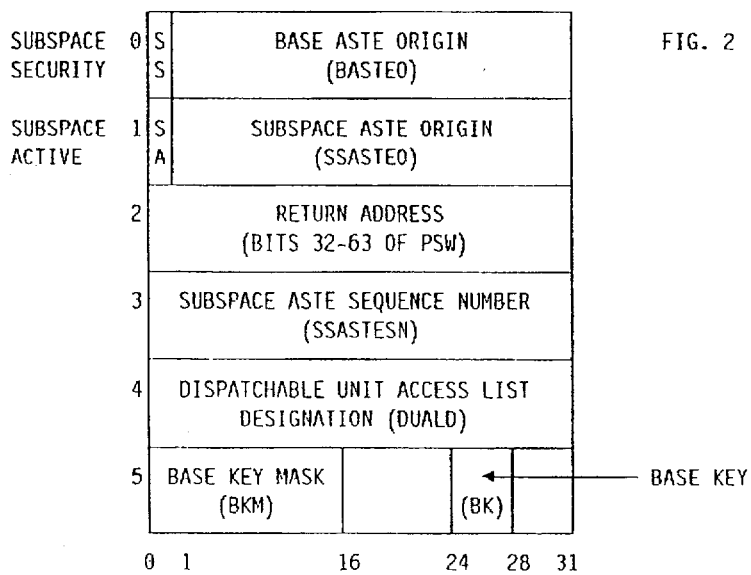
FIG. 2 shows the contents of the dispatchable unit control table (DUCT) used by the secure BSG of this invention.

Dispatchable Unit Control Table (DUCT) Contents for BSG—FIG. 2:

FIG. 2 shows the contents of the dispatchable unit control table (DUCT) used by the secure Branch in Subspace Group instruction (BSG) of this invention. The figure shows six 32-bit words numbered 0–5. The innovative contents are: a subspace-security control bit (SS), bit 0 of word 0; a return address in word 2, and a base key mask (BKM) and base key (BK) in bit positions of word 5.

When SS is zero, BSG performs the prior-art nonsecure operations. When SS is one, BSG performs the secure operations of this invention.

When BSG is executed for a dispatchable unit (DU) when SS is one in the DUCT for the DU and the DU is in the base space, as indicated by the subspace-active indicator bit (SA) in the DUCT being zero, BSG saves the updated instruction address (the address of the next sequential instruction after the BSG), PSW bits 32–63 (which include the addressing-mode bit, bit 32), as the return address in the DUCT; and it also saves the PSW key mask (PKM) and the PSW access key in the DUCT as the BKM and BK, respectively.

Figure 3A:
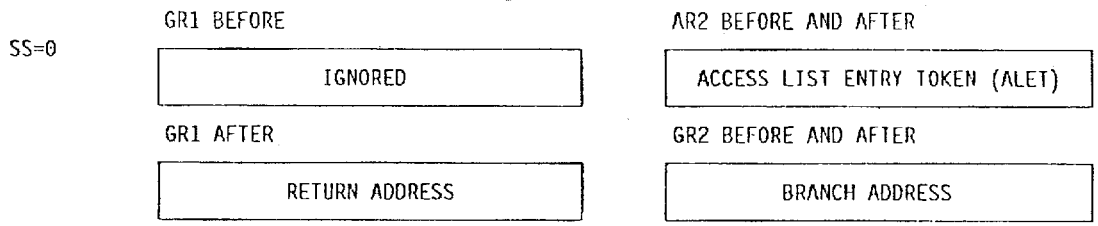
FIGS. 3A–3C show the contents of the registers designated and used by the secure BSG of this invention. The figures show the contents of general register R1 before the execution of BSG and the contents after the execution. The figures also show the unchanging contents of access register R2 and general register R2 both before and after the execution.
Figure 3B:
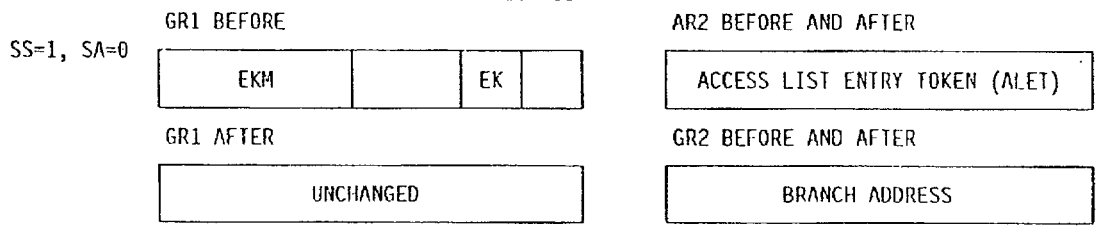
Figure 3C:
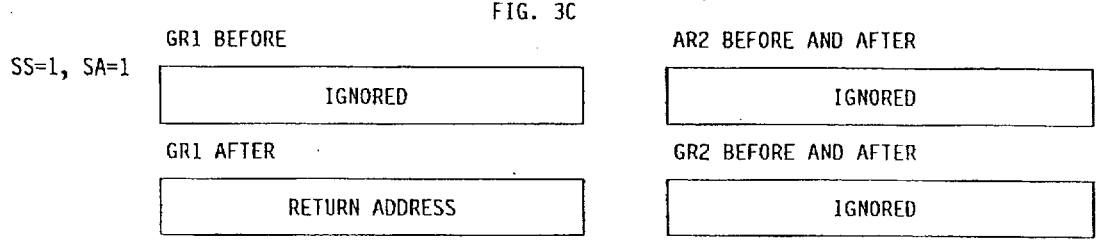

BSG Register Contents—FIGS. 3A–3C

FIGS. 3A–3C show the contents of the registers designated by the R1 and R2 fields of the Branch in Subspace Group instruction (BSG) of this invention. The figures show the contents of general register R1 before the execution of BSG and the contents after the execution. The figures also show the unchanging contents of access register R2 and general register R2 both before and after the execution.

FIG. 3A shows the registers when the subspace-security control bit (SS) in the DUCT is zero, in which case BSG uses the prior-art nonsecure method of operation. The BSG operation is independent of whether the DU is in the base space or in a subspace as indicated by the subspace-active indicator bit (SA) in the DUCT. The initial contents of general register R1 are ignored. Access register R2 contains an access list entry token (ALET) that designates the target address space, and general register R2 contains a branch address (including a new addressing-mode bit) in the target space. The ALET may be ALET 0, ALET 1, or an ALET other than 0 and 1. BSG loads general register R1 with the return address.

FIG. 3B shows the registers when SS is one and SA is zero, where SA being zero indicates that the DU is in the base space of the subspace group. General register R1 contains an entry key mask (EKM) that will be ANDed with the PSW key mask (PKM) in a control register possibly to reduce the authority provided by the PKM. General register R1 also contains an entry key (EK) that will replace the PSW access key in the PSW, provided that the EK is authorized by the new PKM. Access register R2 and general register R2 contain an ALET and branch address just as in the SS=0 case. BSG leaves general register R1 unchanged since it places the return address in the DUCT.

FIG. 3C shows the registers when SS and SA are both one, indicating that the DU is in a subspace of a secure subspace group. The initial contents of the registers are ignored; BSG will use the return address in the DUCT and transfer to the base space. BSG loads general register R1 with a new return address as in the SS=0 case, since there may be some dependency on this address.

BSG Operation—FIGS. 4A and 4B:

FIGS. 4A and 4B are a flow diagram representing the operation of the Branch In Subspace Group instruction (BSG) of this invention.

Step 41 tests that the BSG is being executed inside of the subspace group associated with the current dispatchable unit (DU). It does so by comparing the current primary ASTE origin (PASTEO, an address) in a control register to the base ASTE origin (BASTEO) in the dispatchable unit control table (DUCT) for the DU. They will be equal during execution in the base space or any subspace of the subspace group, and they will not be equal if, for example, a Program Call (PC) instruction was used to transfer control to an address space outside of the subspace group and there has been no corresponding return transfer to the group. If they are not equal, the BSG is not allowed, and an exception is signalled in step 42.

Step 43 tests the subspace-security control bit (SS) in the DUCT. If it is zero, the prior-art nonsecure method is called for. If it is one, the secure method of this invention is called for. When it is one, the operation proceeds to step 44, where the subspace-active indicator bit (SA) in the DUCT is tested. If SA is one, the operation will be to transfer to the base space and to the return address saved in the DUCT, and the operation proceeds to step 45.

In step 45, SA is set to zero, the primary STD (PSTD) in a control register is loaded with the STD in the ASTE addressed by the BASTEO, the secondary STD (SSTD) in a control register is set equal to the PSTD, the secondary ASN (SASN) in a control register is set equal to the primary ASN (PASN) in a control register, general register R1 is loaded with the updated instruction address and addressing-mode bit in the PSW, those fields in the PSW are loaded with the return address saved in word 2 of the DUCT, and the PSW key mask (PKM) in a control register and the access key in the PSW are loaded from the base key mask (BKM) and base key (BK) fields, respectively, in word 5 of the DUCT. The operation then ends. "PSW key," which appears in the figure, and "PSW access key" are synonymous.

Step 46 is reached when step 44 finds that SA is zero, meaning that control is currently in the base space of the subspace group. A temporary variable, TEMPPKM, is set equal to the AND of the PKM in a control register and the entry key mask (EKM) in general register R1. Step 47 tests that the entry key (EK) in general register R1 is authorized by TEMPPKM. If EK is not authorized, an exception is signalled in step 48. If EK is authorized, the operation proceeds to step 49 to process the access list entry token (ALET) in access register R2 just as in the nonsecure operation.

Step 49 is reached when the operation is nonsecure, or when it is secure and the program being executed for the DU is in the base space as indicated by SA=0. If the ALET in access register R2 is 0, then, in step 50, the destination ASTE origin (DASTEO) (a temporary variable) is set equal to the BASTEO, and the operation proceeds to step 60; control will be transferred to the base space. (It is unlikely that BSG would be used to transfer from the base space to the base space, but it is not prohibited.) If the ALET is not ALET 0, the operation proceeds to step 51.

Step 51 tests the ALET for being ALET 1. If it is not ALET 1, then, in step 52, the DASTE is located by means of a modified access-register translation (ART). At step 53, if the DASTEO equals the BASTEO, the operation proceeds to step 60. Otherwise, the subspace-group (G) bit in the STD in the DASTE is tested for being one, and the base-space (B) bit in the DASTE is tested for being zero. If either test fails, an exception is signalled in step 59. If both tests are passed, the DASTE represents a subspace, and the operation proceeds to step 55.

In step 55, the subspace ASTE origin (SSASTEO) in the DUCT is set equal to the DASTEO, and the subspace ASTE sequence number (SSASTESN) in the DUCT is set equal to the ASTESN in the subspace ASTE (the ASTE designated by the DASTEO). The operation proceeds to step 61.

If the ALET is ALET 1, then, in step 56, the subspace ASTE origin (SSASTEO) is tested for being zero. If it is zero, control has never been transferred to a subspace, and an exception is signalled in step 59. Otherwise, the DASTEO is set equal to the SSASTEO saved in the DUCT, and, in step 58, the DASTE is tested for being valid (bit 0 of word 0 must be zero) and the SSASTESN in the DUCT is tested for being equal to the ASTESN in the DASTE. If the DASTE is invalid or the two ASTESNs are not equal, authority to use the ASTE designated by the SSASTEO has been revoked, and an exception is signalled in step 59. If there is no exception, the operation proceeds to step 61.

Step 60 is reached when the destination address space is the base space. SA in the DUCT is set to zero, and the PSTD in a control register is replaced by the STD in the DASTE. Step 61 is reached when the destination address space is a subspace. SA in the DUCT is set to one, and bits 1-23 and 25-31 of the PSTD are replaced by the same bits of the STD in the DASTE. In either case, the operation proceeds to step 62 in FIG. 4B.

In step 62, the SSTD is set equal to the PSTD, and the SASN is set equal to the PASN. This causes the secondary address space to be the same space as the primary address space.

In step 63, the subspace-security control bit (SS) in the DUCT is tested again. If it is zero, the BSG operation is a nonsecure transfer to either the base space or a subspace, depending on which operations have already been performed, and, in step 64, the return address is saved in general register R1, and PSW bits 32–63 are loaded from general register R2.

Step 65 is reached if the operation is a secure transfer to a subspace. (See step 45 for a secure, transfer to the base space.) The return address is saved in word 2 of the DUCT, the PKM and PSW access key are saved in word 5 of the DUCT, PSW bits 32–63 are loaded from general register R2, the PKM is set equal to the TEMPPKM that was formed in step 46, and the PSW access key is set equal to the entry key in general register R1.

Method 1 of Preventing Use of Access-Register Mode—FIG. 5:

The provision of system integrity by the Branch in Subspace Group instruction (BSG) of this invention is completed by ensuring that an application program in a subspace of a secure subspace group cannot use the access-register mode and access list entries designating other subspaces, which entries must exist for use by BSG, to store in those other subspaces. FIG. 5 shows a first method of meeting said objective. In this method, the Set Address Space Control (SAC) instruction is changed so that it cannot set the access-register mode when it is executed in the problem state in a subspace of a secure subspace group.

FIG. 5 shows an AND circuit operated during the SAC execution. If: (1) the input code specifying the translation mode to be set specifies the access-register mode; (2) the subspace-group (G) bit in the primary STD (PSTD) in a control register is one, indicating that the current primary address space is an address space of a subspace group; (3) the subspace-active indicator bit (SA) is one in the secure DU control table (DUCT) for the DU, indicating that program being executed for the DU is a subspace as opposed to in the base space of the subspace group; (4) the subspace-security control bit (SS) is one in the DUCT, indicating that the secure method of subspace groups is in effect; and (5) the problem-state (P) bit is one in the PSW (program status word) of the CPU, indicating that the DU is in the problem state as opposed to in the privileged supervisor state, then SAC signals an exception and does not enter the access-register mode.

A performance improvement is possible if the "Code for AR Mode Input to SAC" and "G=1 in PSTD" inputs are tested before the remaining three inputs, because, if either of those conditions is not true (1), which would cause a zero output of the pictured AND, accessing of the DUCT can be avoided.

The pictured method assumes that a program executed for a DU associated with a subspace group will not be in a primary address space that is in a subspace group not associated with the DU. That assumption is a good one in practice, but it can be made unnecessary if an input "PASTEO in CR5=BASTEO in DUCT" is added to the AND.

Method 2 of Preventing Use of Access-Register Mode—FIGS. 6A and 6B:

A second method of meeting the objective met in FIG. 5 is shown in FIGS. 6A and 6B.

FIG. 6A shows a dispatchable unit (DU) access list (DUAL) containing entries 3, 4, and 5 designating subspaces, which entries exist so that BSG can use them to transfer control to the subspaces. The use of the entries to access data in the subspaces in the access-register mode is prevented by setting the prior-art fetch-only (F) bit or private (P) bit in the entries to one. This can prevent store accesses, or fetch and store accesses, respectively.

The F or P bit cannot be set to one in entry 2 on the dispatchable-unit access list, designated by ALET 2, because the MVS/ESA control program uses ALET 2 to access the home address space and causes the home address space to be the base space of a dispatchable unit that is in a subspace group. Therefore, a second necessary part of the second method is as shown in FIG. 6B, which shows that ordinary ART is changed so that ALET 2 cannot be used in the problem state in a subspace of a secure subspace group. The description of the AND circuit in FIG. 6B is the same as that of the one in FIG. 5 except that the first (topmost) input is different.

The second method requires that SA and SS be buffered in an internal register of the CPU so that the DUCT need not be fetched each time ART is performed.

Dispatchable Unit Control Table (DUCT) Contents for BSA—FIG. 7:

FIG. 7 shows the contents of the dispatchable unit control table (DUCT) used by the Branch and Set Authority instruction (BSA) of this invention. The figure shows six 32-bit words numbered 0–5. The innovative contents are a return address in word 2 and a base key mask (BKM), base key (BK), and reduced-authority indicator bit (RA) in bit positions of word 5.

When BSA is executed for a dispatchable unit (DU) when RA is zero in the DUCT for the DU, indicating that the DU is in the so-called base-authority state, BSA saves the updated instruction address (the address of the next sequential instruction after the BSA), PSW bits 32–63 (which include the addressing-mode bit, bit 32), as the return address in the DUCT; it saves the PSW key mask (PKM) and the PSW access key in the DUCT as the BKM and BK, respectively; and it sets RA in the DUCT to one to indicate that the DU is now in the reduced-authority state.

BSA Register Contents—FIGS. 8A and 8B:

FIGS. 8A and 8B show the contents of the registers designated by the R1 and R2 fields of the Branch and Set Authority instruction (BSA) of this invention. The figures show the contents of general register R1 before the execution of BSA and the contents after the execution. The figures also show the unchanging contents of general register R2 both before and after the execution.

FIG. 8A shows the registers when the reduced-authority indicator bit (RA) in the DUCT is zero, which indicates that the DU is in the base-authority state. General register R1 contains an entry key mask (EKM) that will be ANDed with the PSW key mask (PKM) in a control register possibly to reduce the authority provided by the PKM. General register R1 also contains an entry key (EK) that will replace the PSW access key in the PSW, provided that the EK is authorized by the new PKM. General register R2 contains a branch address. BSA leaves general register R1 unchanged since it places the return address in the DUCT.

FIG. 8B shows the registers when RA is one, indicating that the DU is in the reduced-authority state. The initial contents of the registers are ignored; BSA will use the return address in the DUCT as its branch address. BSA loads general register R1 with a new return address, which may be a useful action.

BSA Operation—FIG. 9:

FIG. 9 is a flow diagram representing the operation of the Branch and Set Authority instruction (BSA) of this invention.

Step 91 tests the reduced-authority indicator bit (RA) in word 5 of the DUCT for the DU for which BSA is being executed. If RA is zero, the DU is in the base-authority state, and the operation proceeds to step 92.

In step 92, a temporary variable, TEMPPKM, is set equal to the AND of the PKM in a control register and the entry key mask (EKM) in general register R1. Step 93 tests that the entry key (EK) in general register R1 is authorized by TEMPPKM. If EK is not authorized, an exception is signalled in step 94. If EK is authorized, the operation proceeds to step 95.

In step 95, RA is set to one to indicate the reduced-authority state, the return address (the address of the next sequential instruction after the BSA and also the addressing-mode bit, bit 32 of the PSW) is saved in word 2 of the DUCT, the PKM and PSW access key ("PSW key" is synonymous) are saved in word 5 of the DUCT, PSW bits 32–63 are loaded from general register R2, the PKM is set equal to the TEMPPKM that was formed in step 92, and the PSW access key is set equal to the entry key (EK) in general register R1. (When PSW bits 32–63 are loaded from general register R2, bits 33–63 are actually loaded with a 24-bit or 31-bit address as specified by the new bit 32, that is, if the new bit 32 is zero, bits 33–39 are set to zeros regardless of the contents of general register R2.)

Step 96 is reached from step 91 when RA is one, indicating the reduced-authority state. RA is set to zero to indicate the base-authority state, a return address (which may be useful) is saved in general register R1, bits 32–63 of the PSW are loaded with the return address saved in the DUCT, and the PKM in a control register and the PSW access key are set with the BKM and BK, respectively, saved in the DUCT.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

Having thus described our invention, what we claim as new and desire to obtain by Letters Patent is:

1. A method in a computer system executing a sequence of programs of instructions for a dispatchable unit (DU) (a process or task); with a predetermined set of address spaces associated with the DU, the set comprising a base space and one or more subspaces; with a secure (protected from a problem-state program) subspace-active indicator bit (SA) associated with the DU and indicating whether the program being executed for the DU is in the base space (SA=0) or in a subspace (SA=1); with a Branch in Subspace Group instruction (BSG) for branching from a program in the base space to a program in a subspace, or vice versa, and setting SA accordingly; and with the DU having a secure current-authority state(s) that authorizes program operations and that is equal to a base-authority state(s) when a program is being executed for the DU in the base space, a method used by BSG for changing the current-authority state(s) to a reduced-authority state(s) when branching from the base space to a subspace and then for changing the current-authority state(s) back to the base-authority state(s) when BSG is executed in a subspace, the method comprising the steps of:

saving a specified return address and the current-authority state(s) as values in a secure data area associated with the DU during a first branch by a first BSG when the program being executed for the DU is in the base space (as indicated by SA=0), reducing the current-authority state(s) to the reduced-authority state(s) during said first branch, branching to the base space and to the return address saved as a value in the secure data area during a second branch by a second BSG when the program being executed for the DU is in a subspace (as indicated by SA=1), and restoring the current-authority state(s) to the value(s) saved in the secure data area during said second branch.

2. The method of claim 1, further comprising the steps of:

performing the steps of claim 1 only if a secure control bit associated with the DU is in a predetermined state, and performing only the prior-art operations of BSG if said control bit is not in said predetermined state.

3. The method of claim 1, further comprising the steps of:

performing the prior-art operations of BSG as modified by the steps of claim 1 as the operations of a new instruction called, for example, Branch in Subspace Group and Set Authority (BSGSA), and omitting the steps of claim 1 from the operations of BSG.

4. The method of claim 1, the saving step further comprising the step of:

saving as the specified return address the address of the next sequential instruction after the BSG.

5. In a computer system as in claim 1, with the system further having a secure program status word (PSW) access key for controlling accesses to a computer system storage having secure storage keys for preventing storage accesses; and with the system having a secure PSW key mask (PKM) that is a bit string for authorizing a problem-state program to change the PSW access key to any value corresponding to a one bit in the string, the method of claim 1, further comprising a method for changing the PKM, comprising the steps of:

saving the current value of the PKM in the secure data area during said first branch (when BSG is in the base space), reducing the PKM to a specified value having no greater authority than the saved value during said first branch, and restoring the PKM to the value saved in the secure data area, this restoring occurring during said second branch when BSG is in a subspace.

6. The method of claim 5, the reducing step further comprising the step of:

setting the PKM to the result of ANDing the PKM with a specified value.

7. The method of claim 5, further comprising a method for changing the PSW access key, comprising the steps of:

saving the current value of the PSW access key in the secure data area during said first branch (when BSG is in the base space), changing the PSW access key to any specified value authorized by the PKM as reduced during said first branch, and restoring the PSW access key to the value saved in the secure data area, this restoring occurring during said second branch when BSG is in a subspace.

8. In a computer system executing a sequence of programs of instructions for a dispatchable unit (DU) (a process or task); with a predetermined set of program address spaces associated with the DU, the set comprising a base space and one or more subspaces; with a secure (protected from a problem-state program) subspace-active indicator bit (SA) associated with the DU and indicating whether the program being executed for the DU is in the base space (SA=0) or in a Subspace (SA=1); with a Branch in Subspace Group instruction (BSG) for branching from a program in the base space to a program in a subspace, or vice versa, and setting SA accordingly; with the computer system further having an access-register mode allowing storage accesses to data address spaces defined by an access list associated with the DU and having a Set Address Space Control instruction (SAC) for setting the access-register mode; and with BSG using access list entries as designators of subspaces to which to branch, a method of preventing access list entries that designate subspaces from being used by a program in a subspace to perform storage accesses in the access-register mode, comprising the steps of:

receiving and analyzing the contents of SA when SAC is executed to set the access-register mode;

performing a logical operation, said logical operation utilizing the contents of SA as an operand therefor; and generating an exception if the contents of SA indicate that the program is in a subspace (as indicated by SA=1), said exception preventing the setting of the access-register mode by SAC.

9. In a computer system executing a sequence of programs instructions for a dispatchable unit (DU) (a process or task); with a predetermined set of program address spaces associated with the DU, the set comprising a base space and one or more subspaces; with a secure (protected from a problem-state program) subspace-active indicator bit (SA) associated with the DU and indicating whether the program being executed for the DU is in the base space (SA=0) or in a subspace (SA=1); with a Branch in Subspace Group instruction (BSG) for branching from a program in the base space to a program in a subspace, or vice versa, and setting SA accordingly; with the computer system further having an access-register mode allowing storage accesses to data address spaces defined by an access list associated with the DU and having access-register translation (ART) enabling a program to use access list entries to perform storage accesses in the access-register mode; with BSG using access list entries as designators of subspaces to which to branch; and with the access list for a DU possibly having a predetermined entry(s) that is not for use by BSG but does allow storage accesses to the base space in the access-register mode, a method of preventing a program in a subspace from using access list entries to perform storage accesses to other subspaces or the base space in the access-register mode, comprising the steps of:

placing in any access list entry that designates a subspace a control field that inhibits ART from using the access list entry to perform storage accesses in the access-register mode, receiving and analyzing the contents of SA when ART attempts to use said predetermined access list entry(s) that allows access to the base space;

performing a logical operation, said logical operation utilizing the contents of SA as an operand therefor; and generating an exception if the contents of SA indicate that the program is in a subspace (as indicated by SA=1), said exception preventing use of the predetermined access list entry(s) by ART.

10. In a computer system executing a sequence of programs of instructions for a dispatchable unit (DU) (a process or task), with one of these programs being a highly trusted program called a base program and the others being lesser trusted programs called non-base programs; with the DU having a secure current-authority state(s) that authorizes program operations; with a control program of the computer system causing program execution for the DU to begin in the base program with the DU having a current-authority state (s) equal to a base-authority state(s), a method for changing the current-authority state(s) to a reduced-authority state(s) when branching from the base program to a non-base program and then for changing the current-authority state(s) back to the base-authority state(s) when branching from a non-base program to the base program, comprising the steps of:

setting, by the control program, of a secure reduced-authority indicator bit (RA) associated with the DU to 0 when the control program causes program execution to begin for the DU in the base program to indicate that the DU has its non-reduced base authority, executing a novel Branch and Set Authority instruction (BSA) to branch from the base program to a non-base program or vice versa, saving a specified return address and the current-authority state(s) as values in a secure data area associated with the DU during a first branch by a first BSA when the program being executed for the DU is the base program as indicated by RA=0, reducing the current-authority state(s) to the reduced-authority state(s) during said first branch (which requires no provision for system integrity since authority can only be reduced), setting RA to 1 during said first branch, branching to the return address saved as a value secure in the secure data area, this branching occurring during a second branch by a second BSA when the program being executed for the DU is a non-base program as indicated by RA=1, restoring the current-authority state(s) to the value(s) saved in the secure data area, this restoring occurring during said second branch, and setting RA to 0 during said second branch.

11. The method of claim 10, the saving step further comprising the step of:

saving as the specified return address the address of the next sequential instruction after the BSA.

12. In a computer system as in claim 10, with the system further having a secure program status word (PSW) access key for controlling accesses to a computer system storage having secure storage keys for preventing storage accesses; and with the system having a secure PSW key mask (PKM) that is a bit string for authorizing a problem-state program to change the PSW access key to any value corresponding to a one bit in the string, the method of claim 10, further comprising a method for changing the PKM, comprising the steps of:

saving the current value of the PKM in the secure data area during said first branch (when BSA is in the base program), reducing the PKM to a specified value having no greater authority than the saved value during said first branch, and restoring the PKM to the value saved in the secure data area during said second branch (when BSA is in a non-base program).

13. The method of claim 12, the reducing step further comprising the step of:

setting the PKM to the result of ANDing the PKM with a specified value.

14. The method of claim 12, further comprising a method for changing the PSW access key, comprising the steps of:

saving the current value of the PSW access key in the secure data area during said first branch (when BSA is in the base program), changing the PSW access key to any specified value authorized by the PKM reduced during said first branch, restoring the PSW access key to the value saved in the secure data area, this restoring occurring during said second branch (when BSA is in a non-base program).

15. The method of claim 1 or claim 10 in which the current-authority state(s) that is saved and restored is or includes a state for which the base-authority state is a supervisor state and the reduced-authority state is a problem state.

\* \* \* \* \*